USO11314814B2

(12) United States Patent
Cho et al.

(10) Patent No.: US 11,314,814 B2
(45) Date of Patent: Apr. 26, 2022

(54) METHOD FOR SHARING CONTENT BASED ON ACCOUNT GROUP AND ELECTRONIC DEVICE FOR PERFORMING SAME

(71) Applicant: SAMSUNG ELECTRONICS CO., LTD., Suwon-si (KR)

(72) Inventors: Heesuk Cho, Suwon-si (KR); Wooyong Sung, Suwon-si (KR); Kwanghyun Cho, Suwon-si (KR); Jisoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 16/382,763

(22) Filed: Apr. 12, 2019

(65) Prior Publication Data
US 2019/0354556 A1 Nov. 21, 2019

(30) Foreign Application Priority Data

May 21, 2018 (KR) ........................ 10-2018-0057973

(51) Int. Cl.
*G06F 16/9035* (2019.01)
*H04L 29/08* (2006.01)
(Continued)

(52) U.S. Cl.
CPC ........ *G06F 16/9035* (2019.01); *G06F 16/907* (2019.01); *H04L 67/10* (2013.01); *H04L 67/42* (2013.01)

(58) Field of Classification Search
CPC .... G06F 16/178; G06F 16/192; G06F 16/435; G06F 16/50; G06F 16/9035; G06F 16/907
(Continued)

(56) References Cited

U.S. PATENT DOCUMENTS 9,307,006 B2    4/2016   Micucci et al.
10,389,663 B2   8/2019   Uraizee et al.
(Continued)

FOREIGN PATENT DOCUMENTS

CN    102130941 A   7/2011
CN    103561072 A   2/2014
(Continued)

OTHER PUBLICATIONS

International Search Report and Written Opinion dated Jul. 22, 2019 in counterpart International Patent Application No. PCT/KR2019/004460.

(Continued)

*Primary Examiner* — Dangelino N Gortayo
(74) *Attorney, Agent, or Firm* — Nixon & Vanderhye P.C.

(57) ABSTRACT

Disclosed is a method for sharing a content by an electronic device using a cloud service. The method may include: accessing a cloud server through a specified account; displaying a user interface including a list of contents based on a content application being executed; determining at least one shared content to be shared on the cloud server in response to receiving a first input through the user interface; determining an account group on the cloud server accessible to the shared content in response to receiving a second input through the user interface; and transmitting the shared content and information related to the determined account group to the cloud server in response to receiving a third input through the user interface.

20 Claims, 15 Drawing Sheets

(51) Int. Cl.
*H04L 29/06* (2006.01)
*G06F 16/907* (2019.01)
*H04L 67/10* (2022.01)
*H04L 67/01* (2022.01)

(58) Field of Classification Search
USPC .......................................................... 707/723
See application file for complete search history.

(56) References Cited

U.S. PATENT DOCUMENTS

| | | | |
|---|---|---|---|
| 11,170,451 B2* | 11/2021 | Schneider | G06Q 30/0631 |
| 2005/0246283 A1 | 11/2005 | Gwiazda et al. | |
| 2013/0275509 A1* | 10/2013 | Micucci | H04L 67/26 709/204 |
| 2013/0311598 A1* | 11/2013 | Arrouye | H04L 67/1097 709/217 |
| 2014/0365923 A1 | 12/2014 | Lee et al. | |
| 2015/0100509 A1* | 4/2015 | Pappas | G06Q 50/01 705/319 |
| 2015/0370909 A1* | 12/2015 | Volach | H04N 21/4788 707/722 |
| 2017/0032188 A1 | 2/2017 | Zhang et al. | |
| 2017/0147527 A1* | 5/2017 | Chandrasekaran | H04L 67/02 |
| 2017/0244655 A1 | 8/2017 | Moon et al. | |
| 2017/0359331 A1* | 12/2017 | Bonnet | H04L 63/0428 |
| 2018/0052869 A1 | 2/2018 | McElmurray | |
| 2018/0181552 A1* | 6/2018 | Konnola | G06F 40/197 |
| 2018/0365654 A1* | 12/2018 | Carver | G06Q 10/109 |

FOREIGN PATENT DOCUMENTS

| | | |
|---|---|---|
| CN | 103780695 A | 5/2014 |
| CN | 104395855 A | 3/2015 |
| EP | 3 125 179 A1 | 2/2017 |
| JP | 2018-050270 | 3/2018 |
| KR | 10-2010-0062104 | 6/2010 |
| KR | 10-2014-0054666 | 5/2014 |
| KR | 10-2014-0143971 | 12/2014 |
| KR | 20160009291 A | 1/2016 |
| WO | WO 2013/173111 | 11/2013 |

OTHER PUBLICATIONS

English-language machine translation of KP10-2010-0062104.
Extended European Search Report dated Mar. 9, 2021 for EP Application No. 19807756.2.
Chinese Office Action dated Feb. 2, 2021 for CN Application No. 201980032970.0.

* cited by examiner

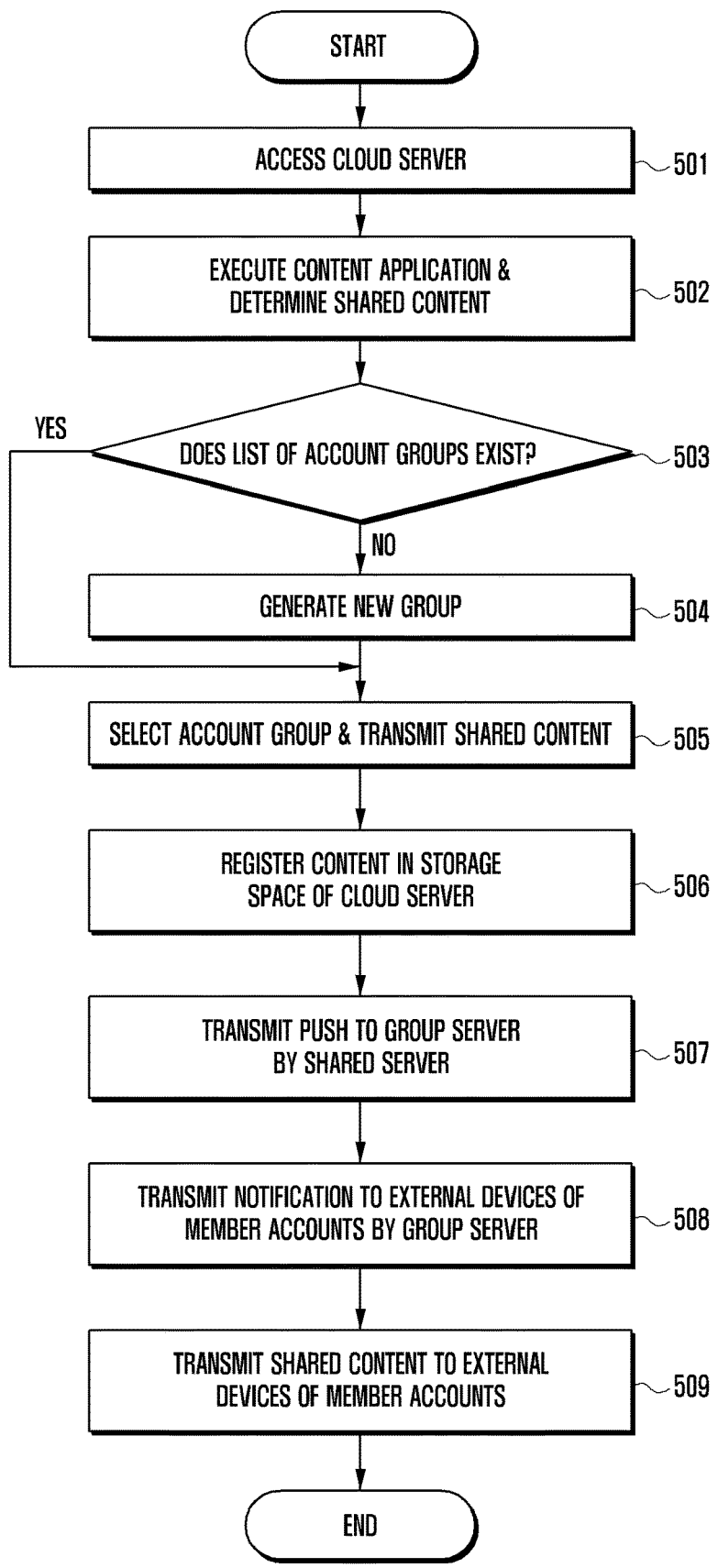

METHOD FOR SHARING CONTENT BASED ON ACCOUNT GROUP AND ELECTRONIC DEVICE FOR PERFORMING SAME

CROSS-REFERENCE TO RELATED APPLICATION

This application is based on and claims priority under 35 U.S.C. 119 to Korean Patent Application No. 10-2018-0057973, filed on May 21, 2018, in the Korean Intellectual Property Office, the disclosure of which is incorporated by reference herein in its entirety.

BACKGROUND

1) Field

The disclosure relates to a method for sharing a content by an electronic device using a cloud service.

2) Description of Related Art

According to the progress of communication technology, electronic devices, for example, smart phones and tablet personal computers (PCs), have come into wide use. A smart phone has various functions added thereto in addition to a voice call and a text service, and has been variously developed in terms of size, design, resolution, and user interface.

An electronic device may use a cloud service to share a content, stored in a memory of the electronic device, with other electronic devices. A cloud service may refer, for example, to a service which enables user contents, such as movies, photographs, music, and documents, to be uploaded to a server or allows a content uploaded to a server to be downloaded and used. A user can safely store a user content in a cloud server, that is, an external server, using a cloud service, and can overcome the limitation of storage space. Also, the user can view and modify the document and the like, created through his or her work, anywhere and at any time.

Recently, with increasing interest in a cloud service, various types of cloud services are provided. Therefore, there has been proposed a method in which a cloud service escapes from a simple service form, satisfies the requirements of a user, and thus provides a function specialized for a cloud service environment.

Content sharing using a conventional cloud service is allowed only among electronic devices which have accessed a cloud server through an identical account. For example, if a photograph stored in a smart phone is desired to be shared with a television (TV) or a refrigerator, the smart phone and the TV need to access a cloud server through an identical account. However, in the related art, if a content is to be shared by a shared device, such as a TV or a refrigerator, used together with another user, the shared device is inconvenienced in that the same needs to access a cloud server through an account of a particular individual.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a method and an electronic device for sharing a content based on an account group so that the content can be more easily shared with devices used by multiple users belonging to the account group.

In accordance with an example aspect of the disclosure, an electronic device may be provided, the electronic device including: a communication circuit; a processor; and a memory configured to store contents and a content application related to a content and electrically connected to the processor, wherein the memory is configured to store instructions that, when executed, cause the processor to control the electronic device to: access a cloud server through a specified account; display a user interface including a list of the contents based on the content application being executed; determine at least one shared content to be shared on the cloud server, in response to a first input received through the user interface; determine an account group on the cloud server accessible to the shared content in response to a second input received through the user interface; and transmit the shared content and information related to the determined account group to the cloud server in response to a third input received through the user interface.

In accordance with another example aspect of the disclosure, a method for sharing a content based on an account group by an electronic device may be provided, the method including: accessing a cloud server through a specified account; displaying a user interface including a list of contents based on a content application being executed; determining at least one shared content to be shared on the cloud server in response to receiving a first input through the user interface; determining an account group on the cloud server accessible to the shared content in response to receiving a second input through the user interface; and transmitting the shared content and information related to the determined account group to the cloud server in response to receiving a third input through the user interface.

In accordance with another aspect of the disclosure, a non-transitory computer readable recording medium having a program recorded thereon for controlling an operation of an electronic device may be provided, the program, when executed by a processor, controlling the electronic device to perform operations including: accessing a cloud server through a specified account; displaying a user interface including a list of contents based on a content application being executed; determining at least one shared content to be shared on the cloud server in response to receiving a first input through the user interface; determining an account group on the cloud server accessible to the shared content in response to receiving a second input through the user interface; and transmitting the shared content and information related to the determined account group to the cloud server in response to receiving a third input through the user interface.

Various example embodiments provide a method for enabling a user to: generate account groups on which a content is to be shared through a content application; and continuously share a content on member accounts belonging to the generated account groups while maintaining the account groups. Further, a content is shared based on account groups on a cloud server, so that a content can be automatically shared with not only a portable communication device but also various devices, for example, home electronic devices, connected to an account.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 5 is a flowchart illustrating an example method for sharing a content in a cloud system according to an embodiment;

DETAILED DESCRIPTION

Figure 1:
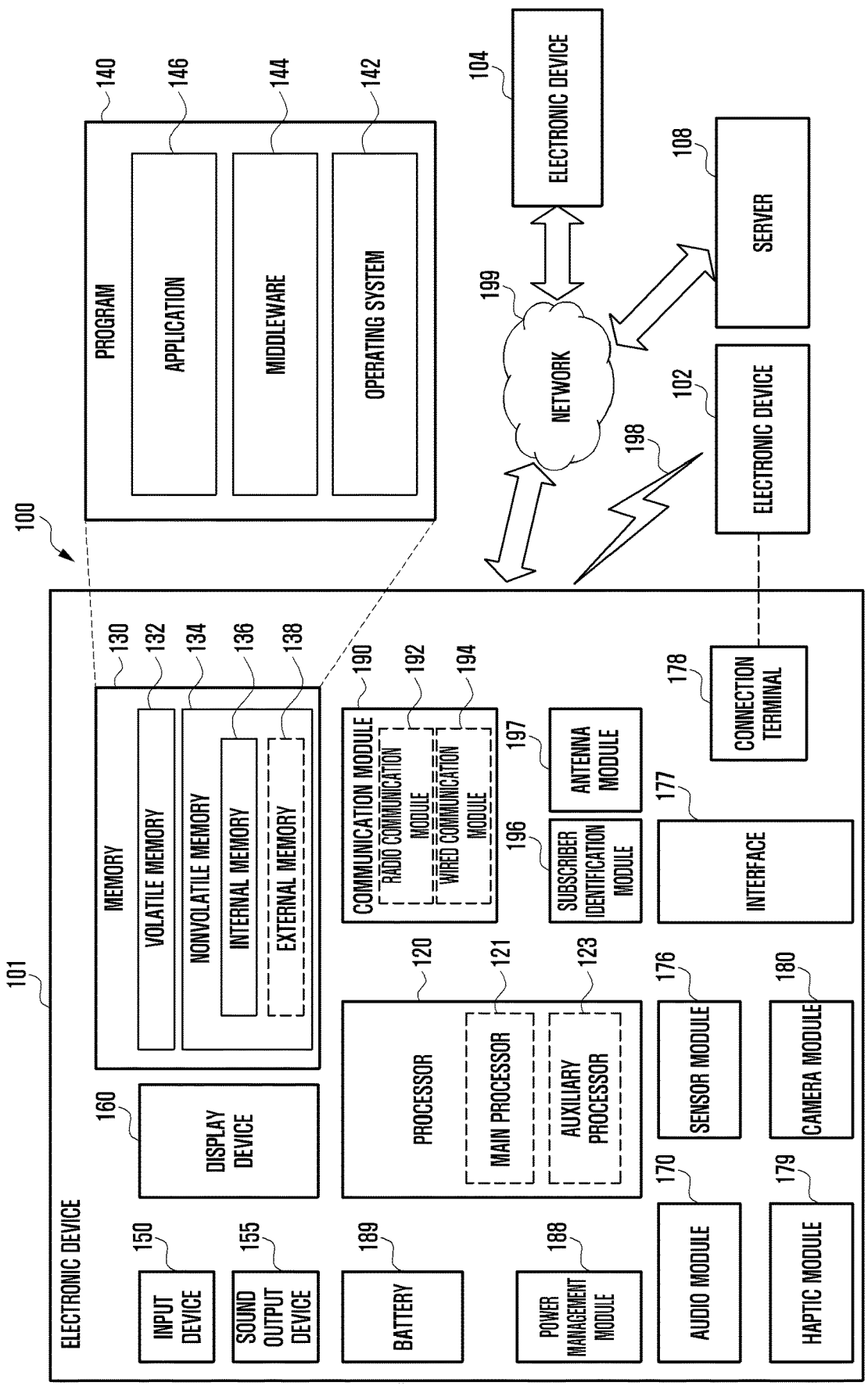
FIG. 1 is a block diagram illustrating a configuration of an example electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
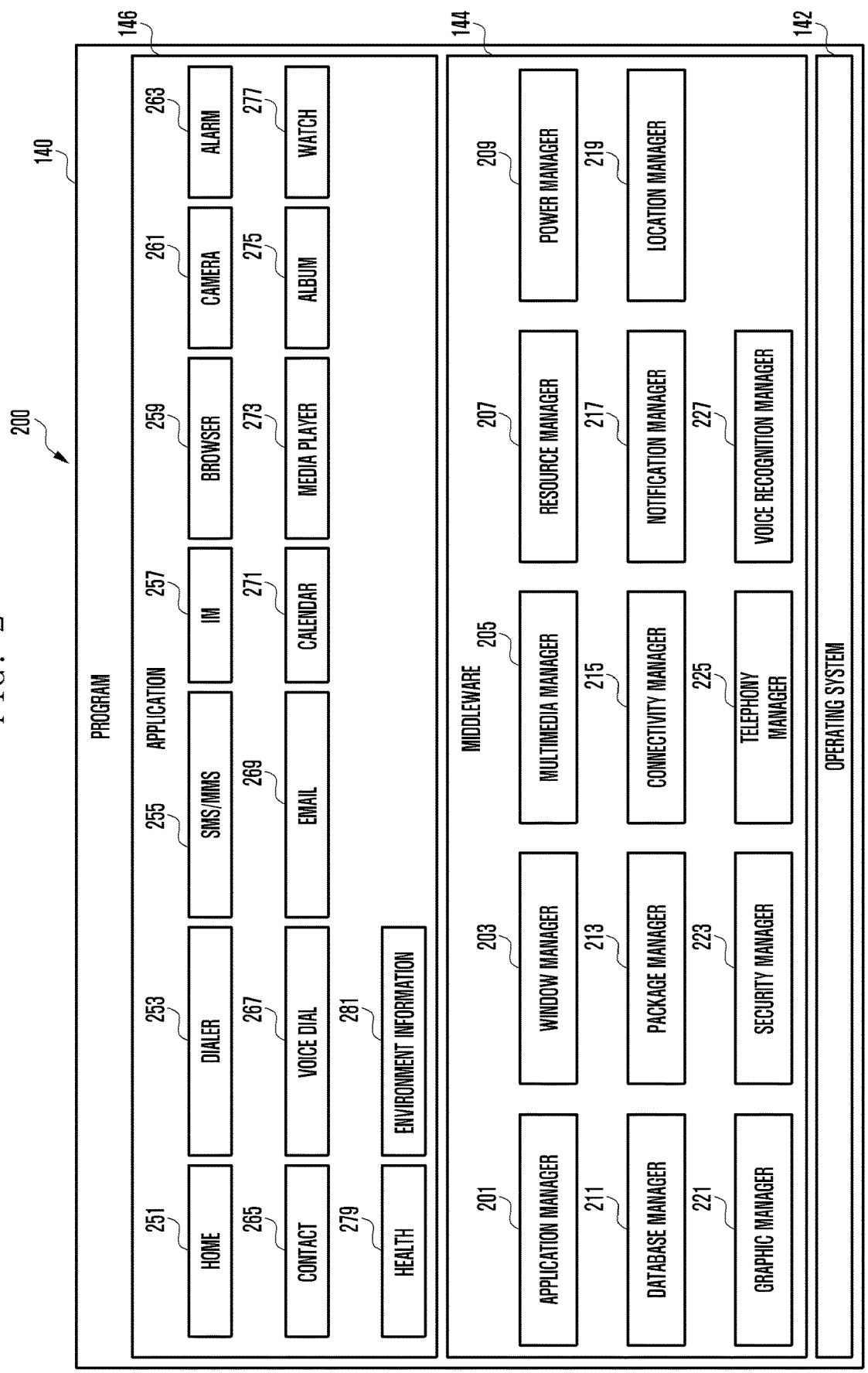
FIG. 2 is a block diagram illustrating an example of a program according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file.

The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

In the disclosure, the term "content" may refer, for example, to data, such as a sign, a character, a voice, a sound, and an image, provided in a digital form, or the like, but is not limited thereto, and may include, for example, and without limitation: contents, such as a file, a photograph file, a music file, and a document file; execution information related thereto; additional information related thereto; and the like. In the disclosure, contents may, for example, be classified into a local content, stored in an electronic device, and a cloud content stored in a cloud server.

In the disclosure, the term "object" may refer, for example, to an object displayed on a display (e.g., a display apparatus 160 of FIG. 1) so as to correspond to a content. For example, an object may include, for example, and without limitation, a content execution icon, a content thumbnail icon, and the like. In the disclosure, objects may be classified into a local object corresponding to a local content and a cloud object corresponding to a cloud content.

In the disclosure, the term "synchronization" may refer, for example, to a process in which: a cloud server transmits data of cloud contents to an electronic device; and the electronic device receives data, and displays, on a display (e.g., the display apparatus 160 of FIG. 1), a cloud object corresponding to a cloud content based on the received data, but the disclosure is not limited thereto.

An electronic device (e.g., an electronic device 310 of FIG. 3) according to an embodiment may include: a communication circuit (e.g., the communication module 190 of FIG. 1); a processor (e.g., the processor 120 of FIG. 1); and a memory (130) configured to store contents and a content application related to a content and electrically connected to the processor 120, wherein the memory (130) is configured to store instructions that, when executed by the processor, control the electronic device 310 to: access a cloud server (e.g., a cloud server 320 of FIG. 3) through a specified account; display a user interface including a list of the contents based on the content application being executed; determine at least one shared content to be shared on the cloud server 320 in response to a first input received through the user interface; determine an account group on the cloud server 320 accessible to the shared content in response to a second input received through the user interface; and transmit the shared content and information related to the determined account group to the cloud server 320 in response to a third input received through the user interface.

The processor 120 may be configured to control the electronic device to: based on the account group being determined, display a list of at least one pre-generated account group; and determine the account group based on an input for selection of at least one of the account groups included in the list.

The processor 120 may be configured to control the electronic device to: based on the account group being determined, determine the account group based on an input for generation of a new account group; and add the new account group to the list and display the list having the new account group added thereto.

The processor 120 may be configured to control the electronic device to transmit the shared content and display the list of the generated account group in an album and/or folder form.

The processor 120 may be configured to control the electronic device to display only an account group to which a particular account belongs in the list, in response to an input for searching for the particular account.

The processor 120 may be configured to control the electronic device to: based on the shared content being transmitted, determine whether a content identical to the shared content exists in a storage space related to the account group on the cloud server 320; and transmit the shared content to the cloud server 320 based on the content identical to the shared content not existing in the storage space.

The processor 120 may be configured to control the electronic device to: based on external devices (e.g., external devices 341 and 342 of FIG. 3) storing external contents stored in the external devices 341 and 342, in the storage space through another account belonging to the account group, receive the external contents from the cloud server 320; and add the received external contents to the album and/or the folder corresponding to the account group.

The processor 120 may be configured to control the electronic device to: display the shared content and/or the external contents included in the album and/or the folder, in response to an input for selection of the album and/or the folder; and display an identifier indicating the shared content on an object related to the shared content.

The processor 120 may be configured to control the electronic device to: determine, as a private content, at least a part of the list of the contents based on an input; and exclude the determined private content from a subject to be transmitted to the cloud server 320. The content application may include a photograph gallery application.

Figure 3:
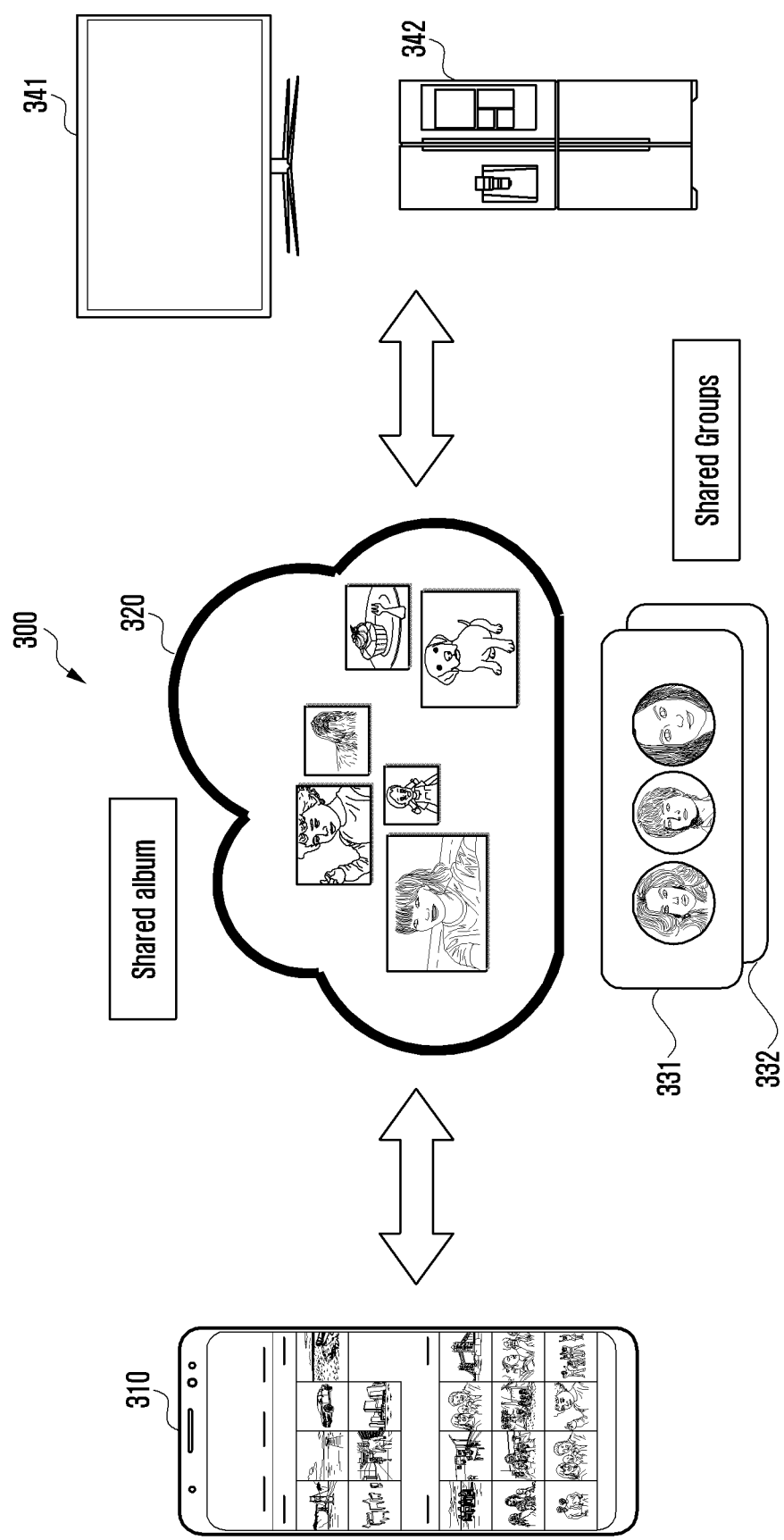
FIG. 3 is a diagram illustrating an example configuration of a cloud system according to an embodiment.

FIG. 3 is a diagram illustrating a configuration of a cloud system 300 according to an embodiment.

Referring to FIG. 3, the cloud system 300 according to an embodiment may include an electronic device 310, a cloud server 320, and at least one external device 341 and/or 342. According to an embodiment, the electronic device 310 and the at least one external device 341 and/or 342 may be, for example, and without limitation, a portable communication device (e.g., a smart phone), a computer device, a portable multimedia device, a portable medical device, a camera, a wearable device, a home electronic device, or the like.

According to an embodiment, the electronic device 310 may be configured to access the cloud server 320 through a user (or specified) account so as to upload a content to the cloud server 320 and/or download a content therefrom. For example, in order to access the cloud server 320, the electronic device 310 may be configured to transmit an access request message to the cloud server 320 based on address information (e.g., URL or IP) of the cloud server 320. According to an embodiment, the cloud server 320 may be configured to, in response to reception of the access request message from the electronic device 310, perform an authentication procedure (e.g., may input an account ID and an account password for a cloud service or may input biometric information) for the electronic device 310 and allow access of the electronic device 310 having the appropriate right.

According to an embodiment, the electronic device 310 may be configured to transmit a request signal for synchronization with the cloud server 320 to the cloud server 320 through an Internet network (e.g., wired or wireless). According to an embodiment, the cloud server 320 may be configured to transmit metadata of a cloud content to the electronic device 310 in response to the synchronization request signal. According to an embodiment, the term "synchronization" may refer, for example, to a scheme for maintaining data, stored in at least two physically different data spaces, so as to be identical to each other. According to an embodiment, the synchronization may include, for example, and without limitation: (i) a series of processes in which the electronic device 310 and/or the external device 341 and/or 342 transmits metadata of contents to the cloud server 320, and the cloud server 320 receives and stores metadata; and (ii) a series of processes in which the cloud server 320 transmits metadata of cloud contents to the electronic device 310 and/or the external device 341 and/or 342, and the electronic device 310 and/or the external device 341 and/or 342 receives metadata and displays, on the display, a cloud object corresponding to a cloud content based on the received metadata. According to an embodiment, the electronic device 310 may be configured to determine account groups 331 and 332 accessible to the storage space of the cloud server 320, in which a content is stored, based on an input (e.g., a user input), and may be configured to transmit, to the cloud server 320, information related to the determined account groups 331 and 332 when metadata of contents is transmitted.

According to an embodiment, the cloud server 320 may be connected to the electronic device 310 and the at least one external device 341 or 342 based on the account groups 331 and 332 (e.g., shared groups) having the right, and may be configured to provide various cloud services, for example, content upload, content download, and content synchronization. According to an embodiment, the cloud server 320 may be configured to provide a storage space shared and used by the electronic device 310 and the at least one external device 341 or 342 based on the account groups 331 and 332 having the right. For example, the cloud server 320 may be configured to allocate a storage space for common use (e.g., a shared album) to the electronic device 310 and the at least one external device 341 or 342 which have accessed the cloud server 320 through an account belonging to the designated account groups 331 and 332. According to an embodiment, the electronic device 310 and the at least one external device 341 or 342 which have accessed the cloud server 320 through an account belonging to the designated account groups 331 and 332 may be configured to access the storage space for common use allocated by the cloud server 320 and then upload, download, and/or delete a content.

According to an embodiment, the cloud server 320 may be configured to transmit metadata of contents stored in the storage space to the electronic device 310 and the at least one external device 341 and/or 342 which have accessed the cloud server 320 through the designated account groups 331 and 332. According to an embodiment, metadata may include, for example, and without limitation: thumbnail files, such as a photograph file, a moving image file, a document file, and a music file, stored in the cloud server 320; a preview file stored therein; a pre-listening file stored therein; pieces of information related to the respective files, or the like.

Figure 4:
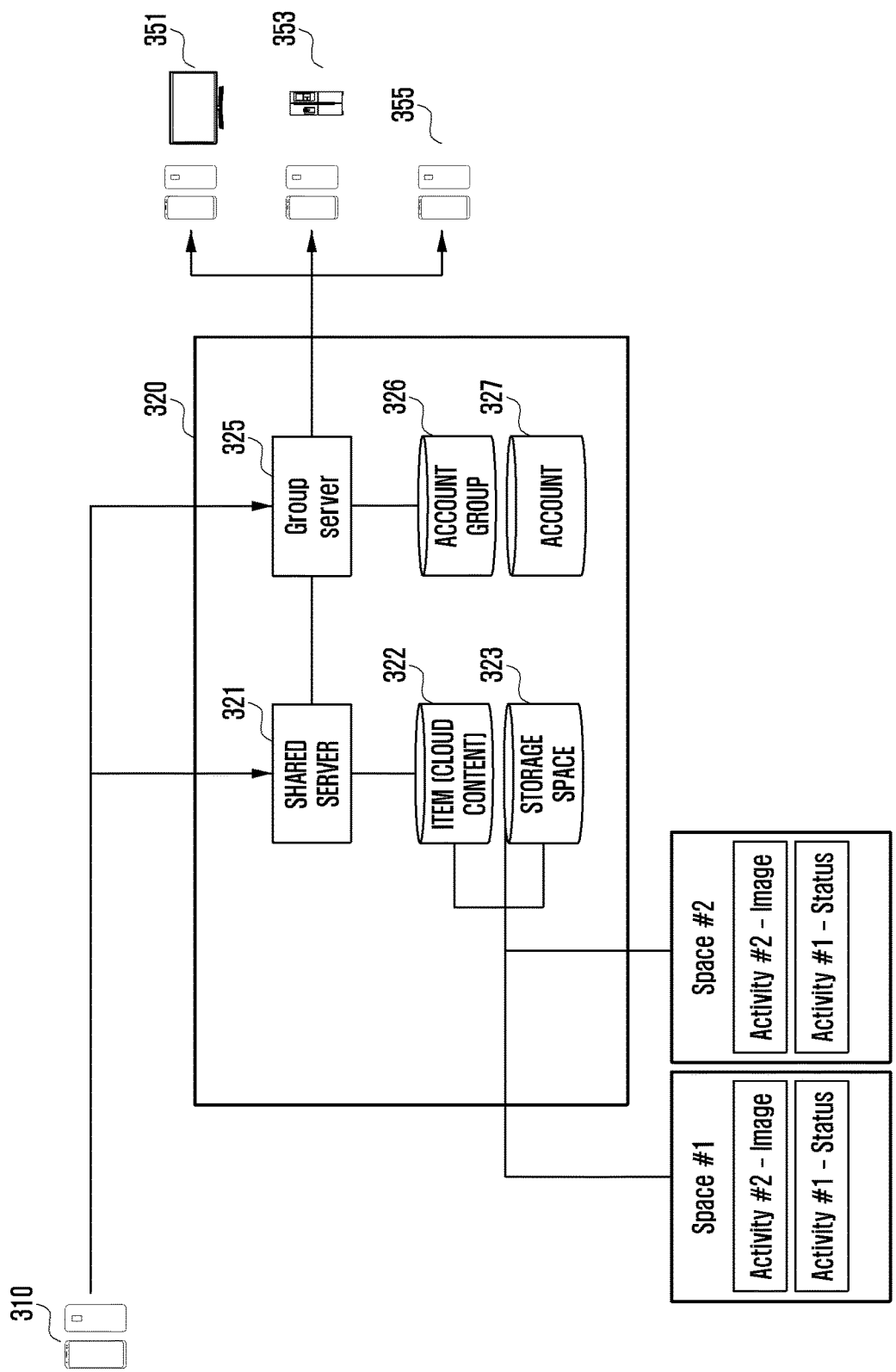
FIG. 4 is a diagram illustrating an example configuration of a cloud server according to an embodiment.

FIG. 4 is a diagram illustrating an example configuration of a cloud server 320 according to an embodiment.

Referring to FIG. 4, the cloud server (e.g., the cloud server 320 of FIG. 3) according to an embodiment may include a shared server 321 and a group server 325.

According to an embodiment, an electronic device (e.g., the electronic device 310 of FIG. 3) may be configured to access the cloud server 320 and then manage a storage space 323 of the shared server 321 and an item 322 of the shared server 321, for example, a cloud content 322, stored in the storage space 323. For example, the electronic device 310 may be configured to access the storage space 323 for common use allocated by the cloud server 320 and then upload, download, and delete a content.

According to an embodiment, the shared server 321 may be configured to transmit a push message to the group server 325 in response to the occurrence of a change of the information stored in the storage space 323, and the group server 325 may be configured to transmit a notification providing notification of the change of the storage space 323 to the electronic device 310 and/or external devices 351, 353, and 355 (e.g., the external devices 341 and 342 of FIG. 3) which have accessed through an account 327 belonging to an account group 326 (e.g., the account groups 331 or 332 of FIG. 3) in response to the push message. For example, a notification transmitted by the group server 325 may include a message, which requests a synchronization operation, to the electronic device 310 and/or the external devices 351, 353, and 355 which have accessed the cloud server 320 through an account 327 belonging to the account group 326. For example, in response to the notification, the external devices 351, 353, and 355, which have accessed the cloud server 320 through an account 327 belonging to the account group 326, may be configured to receive a content, which has been transmitted to the storage space 323 of the shared server 321 by the electronic device 310, and store the received content. According to an embodiment, the external devices 351, 353, and 355, which have accessed the cloud server 320 through an account 327 belonging to the account group 326, may include, for example, at least one first external device 351 having accessed the cloud server 320 through a first user account, at least one second external device 353 having accessed the cloud server 320 through a second user account, at least one third external device 355 having accessed the cloud server 320 through a third user account, or the like. According to an embodiment, the first to third user accounts may be different accounts, and may be accounts that the electronic device 310 has designated in such a manner that the accounts belong to the account groups 326.

According to an embodiment, the electronic device 310 may be configured to access the cloud server 320 and then manage the group server 325 based on the account group 326. For example, the electronic device 310 may be configured to determine the account group 326 accessible to the storage space 323 of the cloud server 320 and manage (e.g., add or delete) accounts belonging to the determined account group 326.

A method for sharing a content based on an account group by an electronic device 310 according to an embodiment may include: accessing a cloud server 320 through a specified account; displaying a user interface including a list of contents based on a content application being executed; determining at least one shared content to be shared on the cloud server 320 in response to a first input being received through the user interface; determining an account group on the cloud server 320 accessible to the shared content in response to a second input being received through the user interface; and transmitting the shared content and information related to the determined account group to the cloud server 320 in response to a third input being received through the user interface.

The determining of the account group may include: displaying a list of at least one pre-generated account group; and determining the account group based on an input for selection of at least one of the account groups included in the list.

The determining of the account group may include: determining the account group based on an input for generation of a new account group; and adding the new account group to the list and displaying the list having the new account group added thereto.

The method may further include transmitting the shared content and displaying the list of the generated account group in an album and/or folder form.

The method may further include displaying only an account group, to which a particular account belongs in the list in response to an input for searching for the particular account.

The transmitting of the shared content may include: determining whether a content identical to the shared content exists in a storage space related to the account group on the cloud server 320; and transmitting the shared content to the cloud server 320 based on the content identical to the shared content not existing in the storage space.

The method may further include: based on external devices 341 and 342 storing external contents, stored in the external devices 341 and 342, in the storage space through another account belonging to the account group, receiving the external contents from the cloud server 320; and adding the received external contents to the album and/or the folder corresponding to the account group.

The method may further include: displaying the shared content and/or the external contents included in the album and/or the folder, in response to a an input for selection of the album and/or the folder; and displaying an identifier indicating the shared content on an object related to the shared content.

The method may further include: determining, as a private content, at least a part of the list of the contents based on an input; and excluding the determined private content from a subject to be transmitted to the cloud server 320.

A non-transitory computer readable recording medium having a program recorded thereon which, when executed by a processor or computer, controls an electronic device 310 to perform operations including: accessing a cloud server 320 through a specified account; displaying a user interface including a list of contents based on a content application being executed; determining at least one shared content to be shared on the cloud server 320 in response to a first input being received through the user interface; determining an account group on the cloud server 320 accessible to the shared content in response to a second input being received through the user interface; and transmitting the shared content and information related to the determined account group to the cloud server 320 in response to a third input being received through the user interface.

Figure 6A:
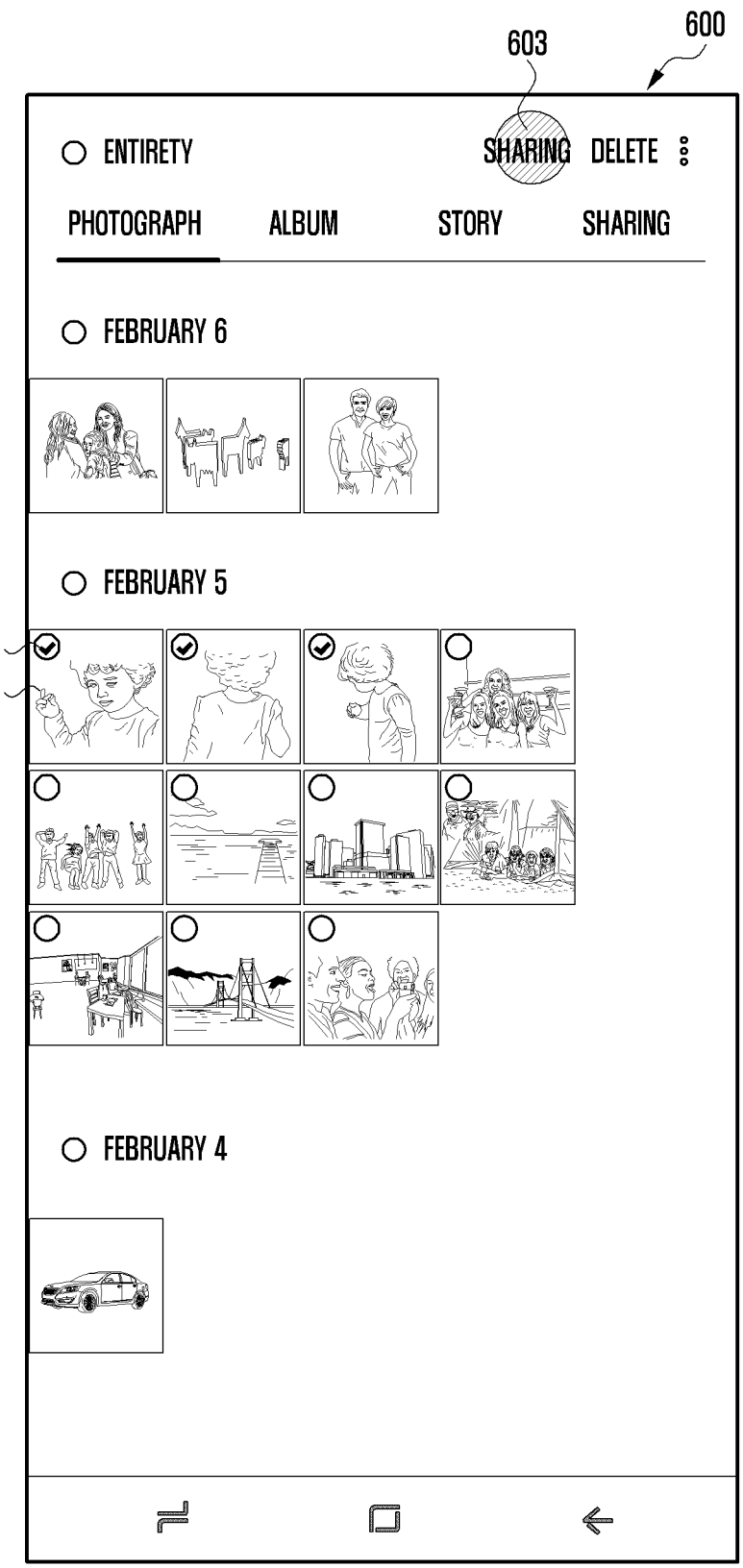
FIG. 6A is a diagram illustrating an example of a method for sharing a content in a cloud system according to an embodiment.
Figure 6B:
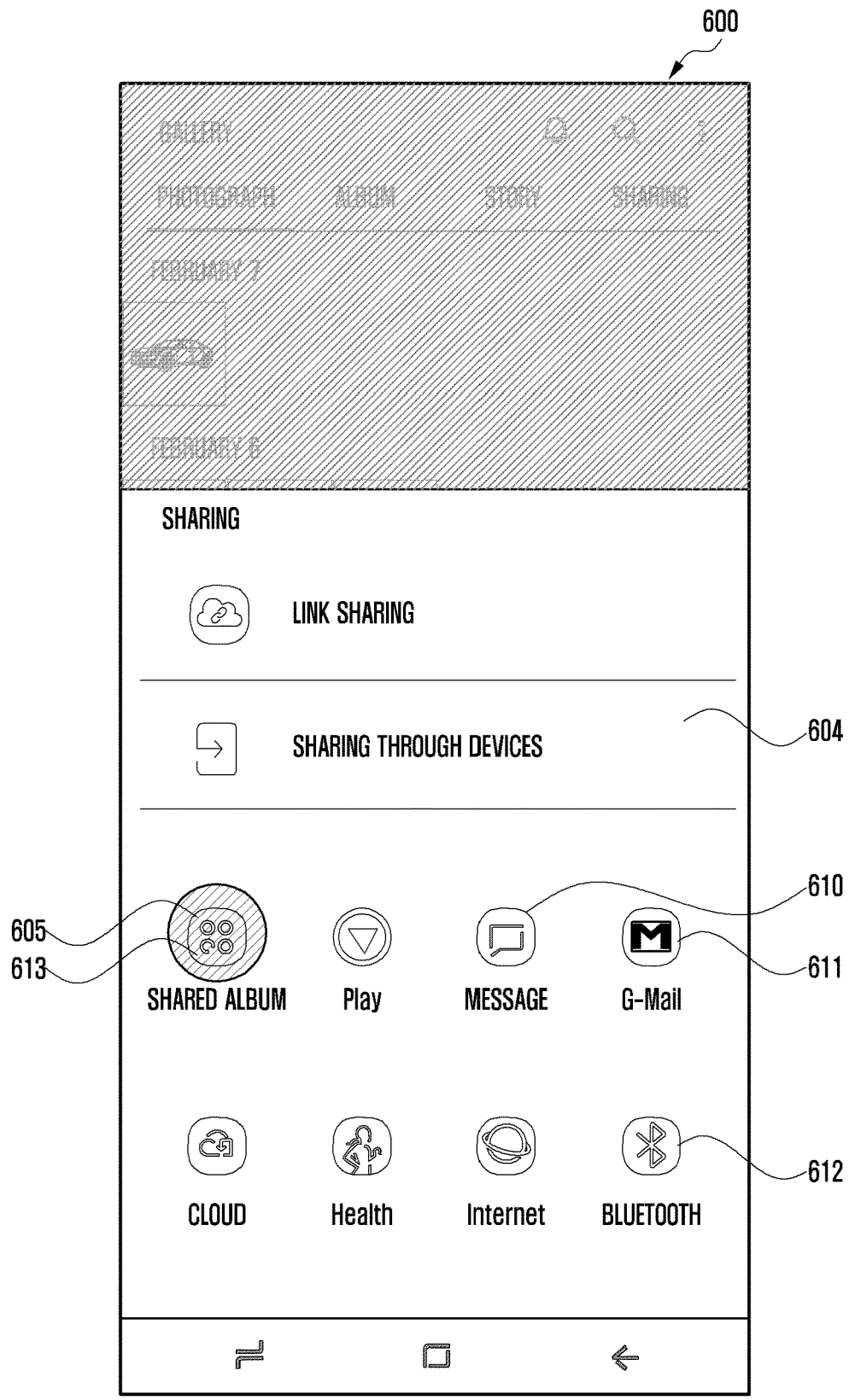
FIG. 6B is a diagram illustrating an example of a method for sharing a content in a cloud system according to an embodiment.
Figure 6C:
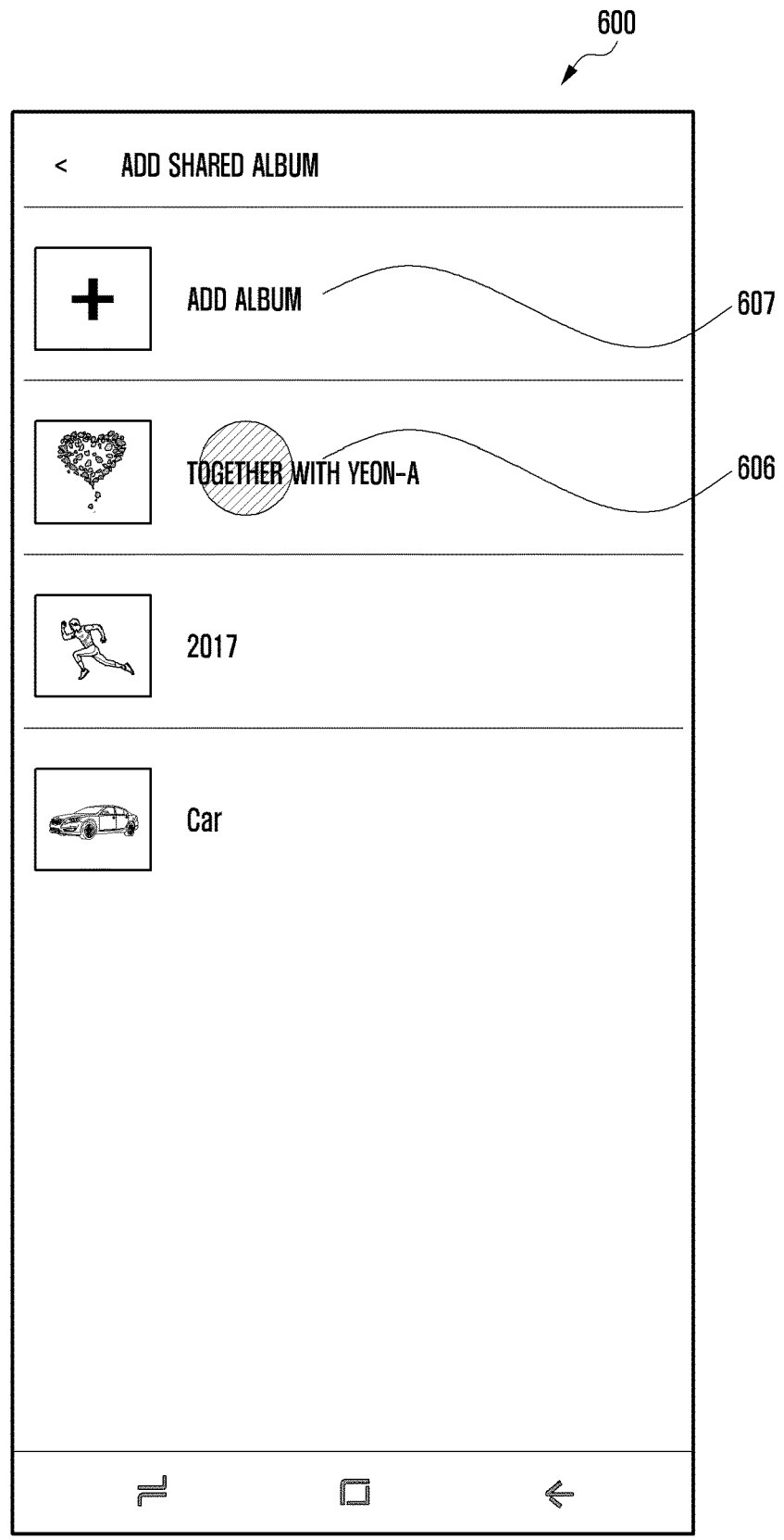
FIG. 6C is a diagram illustrating an example of a method for sharing a content in a cloud system according to an embodiment.
Figure 6D:
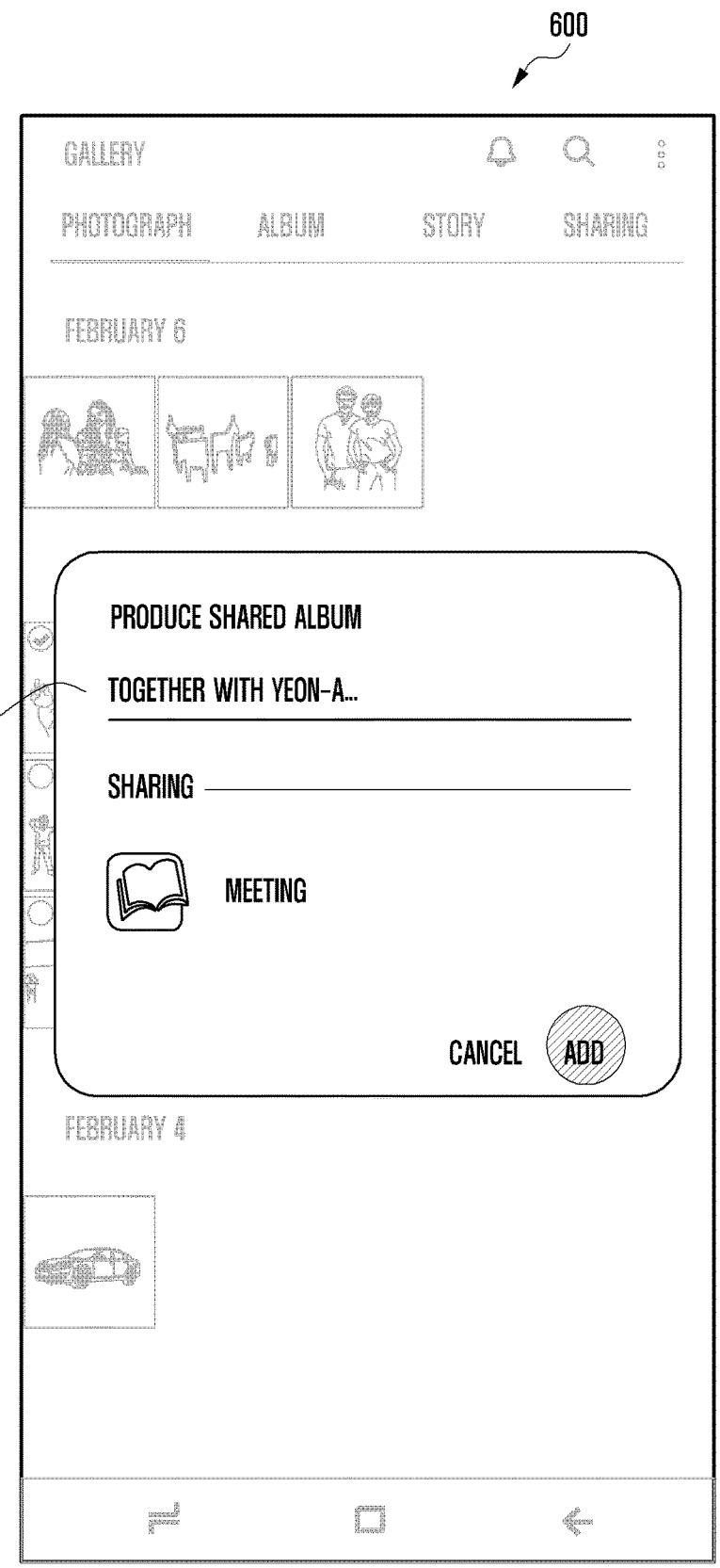
FIG. 6D is a diagram illustrating an example of a method for sharing a content in a cloud system according to an embodiment.
Figure 6E:
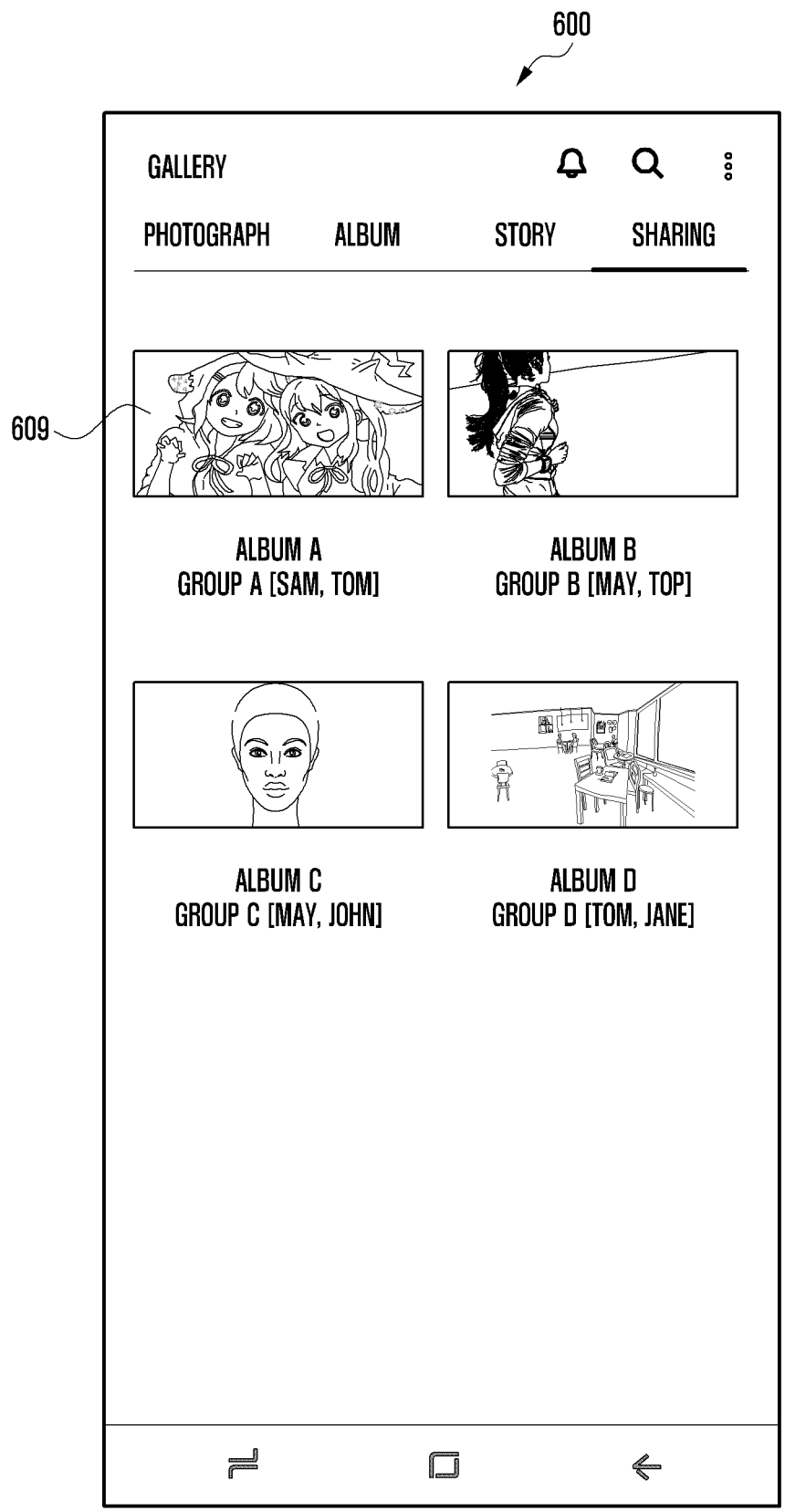
FIG. 6E is a diagram illustrating an example of a method for sharing a content in a cloud system according to an embodiment.

FIG. 5 is a flowchart illustrating an example method for sharing a content in a cloud system 300 according to an embodiment. FIG. 6A is a diagram illustrating an example of a method for sharing a content in a cloud system 300 according to an embodiment. FIG. 6B is a diagram illustrating an example of a method for sharing a content in a cloud system 300 according to an embodiment. FIG. 6C is a diagram illustrating an example of a method for sharing a content in a cloud system 300 according to an embodiment. FIG. 6D is a diagram illustrating an example of a method for sharing a content in a cloud system 300 according to an embodiment. FIG. 6E is a diagram illustrating an example of a method for sharing a content in a cloud system 300 according to an embodiment. Hereinafter, a method for sharing a content in the cloud system 300 according to an example embodiment will be described in greater detail below with reference to FIG. 5 and FIGS. 6A to 6E.

In operation 501, an electronic device (e.g., the electronic device 310 of FIG. 3) according to an embodiment may access a cloud server (e.g., the cloud server 320 of FIG. 3) through a specified account (e.g., a user account). For example, in order to access the cloud server 320, the electronic device 310 may transmit an access request message to the cloud server 320 based on address information (e.g., URL or IP) of the cloud server 320. According to an embodiment, in response to reception of the access request message from the electronic device 310, the cloud server 320 may perform an authentication procedure (e.g., may input an account ID and an account password for a cloud service or may input biometric information) for the electronic device 310, and may allow access of the electronic device 310 having the right.

In operation 502, the electronic device 310 according to an embodiment may execute a content application, and may determine a shared content through a user interface provided by the content application. According to an embodiment, a shared content may refer to a content that the electronic device 310 shares with at least one external device (e.g., the external devices 341 and 342 of FIG. 3) on the cloud server 320. According to an embodiment, if a content application is executed, the electronic device 310 may display a user interface provided by the content application, and the user interface may include a list of contents. According to an embodiment, a content is a local content stored in the electronic device 310, which may be a photograph file, and a content application may be a photograph gallery application. For example, as illustrated in FIG. 6A, if a photograph gallery application is executed, the electronic device 310 may display a user interface 600 including a list of photograph files 601. The electronic device 310 may receive a first user input 602 for selection of at least some photograph files from the list of the photograph files 601, and may determine a shared content to be shared on the cloud server 320 based on the first user input 602.

In operation 503, the electronic device 310 according to an embodiment may identify (determine) whether a list of pre-generated account groups 331 and 332 exist. If the list of the pre-generated account groups 331 and 332 exist, the electronic device 310 may display the list of the pre-generated account groups 331 and 332. For example, the electronic device 310 may receive a first user input for determination of a shared content, and may then receive a user input 603 for selection of an object related to a sharing function, as indicated by reference numeral 603 of FIG. 6A.

Referring to FIG. 6B, the electronic device 310 according to an embodiment may display a list related to a content sharing method, in response to the user input 603 for selection of an object related to a sharing function. According to an embodiment, objects related to a content sharing method may be displayed, for example, in the form of a bottom sheet 604 at a lower end part of the user interface 600. According to an embodiment, the objects related to a content sharing method may include a message application 610, an email application 611, short-range communication (e.g., Bluetooth) 612, or objects using a cloud service 613. According to an embodiment, an object configured to share a content by using the cloud service 613 may be an icon 613 for generation of a shared album on the cloud server 320.

Referring to FIG. 6C, the electronic device 310 according to an embodiment may display a list 606 of the pre-generated account groups 331 and 332, in response to a user input 605 for selection of the icon 613 for generation of a shared album. According to an embodiment, the list 606 of the pre-generated account groups 331 and 332 may be displayed in an album or folder form.

In operation 504, the electronic device 310 according to an embodiment may generate a new group based on a user input (No' in operation 503). For example, after determining a shared content, the electronic device 310 may receive a user input for selection of generation of new account groups 331 and 332, as indicated by reference numeral 607 of FIG. 6C. In response to the user input 607, the electronic device 310 may display a user interface 608 for generation of a new group, as illustrated in FIG. 6D. For example, the electronic device 310 may determine names of the account groups 331 and 332 and accounts belonging to the account groups 331 and 332, through the user interface 608. According to an embodiment, the electronic device 310 may display a list of user accounts of users who are subscribing to a cloud service in a contact list stored in the electronic device 310 so that a user can select an account belonging to the account groups 331 and 332.

In operation 505, the electronic device 310 according to an embodiment may select at least one account group from the list 606 of the pre-generated account groups 331 and 332, or may receive a user input for selection of generation of a new group. For example, based on a second user input, the electronic device 310 may select one group or multiple groups from the list 606 of the pre-generated account groups 331 and 332. The electronic device 310 according to an embodiment may simultaneously transmit the selected shared content to multiple groups, wherein members of one group are different from those of another, so that the multiple groups can more easily share the same.

According to an embodiment, the electronic device 310 may transmit the shared content and information related to the determined account groups 331 and 332, to the cloud server 320 in response to a third user input. According to an embodiment, the information related to the determined account groups 331 and 332 may include an ID of each of accounts belonging to the determined account groups 331 and 332.

In operation 506, the electronic device 310 according to an embodiment may register (or store) the shared content in a storage space 323 related to the account groups 331 and 332 on the cloud server 320. For example, the electronic device 310 may access the storage space 323 allocated by the cloud server 320 in relation to the account groups 331 and 332 so as to upload the shared content to the storage space 323. If the upload of the shared content is completed, as illustrated in FIG. 6E, the electronic device 310 according to an embodiment may display a list 609 of the generated account groups 331 and 332 in a folder and/or album form through a sharing tab of the user interface provided by the content application.

According to an embodiment, if the upload of the shared content is completed, the electronic device 310 may display a shared history as detailed information of the shared content through the content application and the like. For example, if a contact application stores account information of a particular user on the cloud server, the electronic device 310 may display, as detailed information, a shared file history to a cloud server account of a relevant contact. The electronic device 310 may display the detailed information through the contact application or the content application.

In operation 507, according to an embodiment, the shared server 321 of the cloud server 320 may transmit a push message to the group server 325 in response to a change of the information stored in the storage space 323. According to an embodiment, a change of the information stored in the storage space 323 may refer to a case in which a new content is registered in the storage space 323 or a pre-stored content is deleted or changed therein.

In operation 508, in response to the push message, the group server 325 of the cloud server 320 according to an embodiment may transmit a notification, which provides notification of the change of the storage space 323, to the electronic device 310 or the external devices 341 and 342 which have accessed the cloud server 320 through an account belonging to the account groups 331 and 332. For example, a notification transmitted by the group server 325 may include a message for requesting, for a synchronization operation, the electronic device 310 or the external devices 341 and 342 which have accessed the cloud server 320 through an account belonging to the account groups 331 and 332.

In operation 509, the shared server 321 of the cloud server 320 according to an embodiment may transmit, as a synchronization operation, the shared content to the electronic device 310 or the external devices 341 and 342 which have accessed the cloud server 320 through a member account belonging to the account groups 331 and 332.

Figure 7:
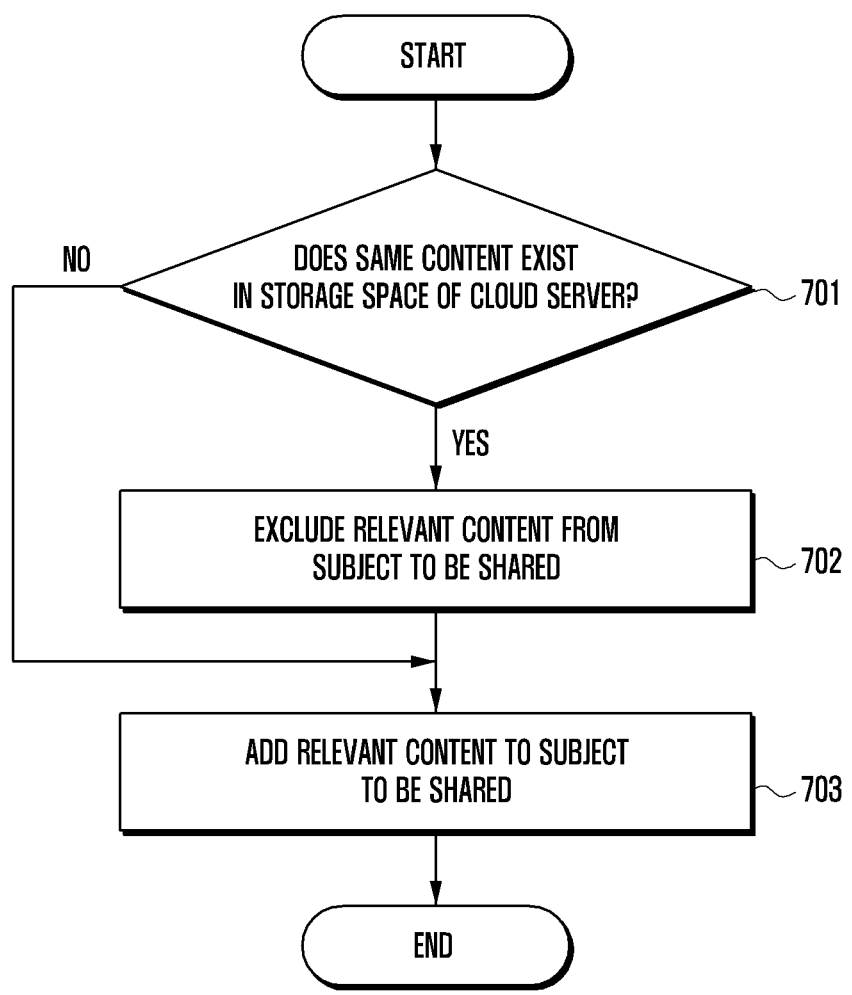
FIG. 7 is a flowchart illustrating an example method for preventing the upload of a duplicate content by an electronic device according to an embodiment.

FIG. 7 is a flowchart illustrating an example method for preventing the upload of a duplicate content by the electronic device 310 according to an embodiment.

In a content sharing method according to an embodiment, an electronic device (e.g., the electronic device 310 of FIG. 3) and/or external devices (e.g., the external devices 341 and 342 of FIG. 3), which have accessed a cloud server (e.g., the cloud server 320 of FIG. 3) through an account belonging to account groups (e.g., the account groups 331 and 332 of FIG. 3), may access a storage space (e.g., the storage space 323 of FIG. 4) of the cloud server so as to upload and/or download a content to or from the storage space. Therefore, there may be a concern that a duplicate content is uploaded to the storage space 323. In order to prevent the concern, the electronic device 310 according to an embodiment can prevent the upload of a duplicate content by performing a series of operations described below.

In operation 701, if a shared content is determined, the electronic device 310 according to an embodiment may identify whether a content identical to the shared content exists in the storage space 323 of the cloud server 320.

In operation 702, if a content identical to the shared content exists in the storage space 323 of the cloud server 320, the electronic device 310 according to an embodiment may exclude the relevant content from a subject to be shared.

In operation 703, if a content identical to the shared content does not exist in the storage space 323 of the cloud server 320, the electronic device 310 according to an embodiment may add the relevant content to a subject to be shared.

Figure 8A:
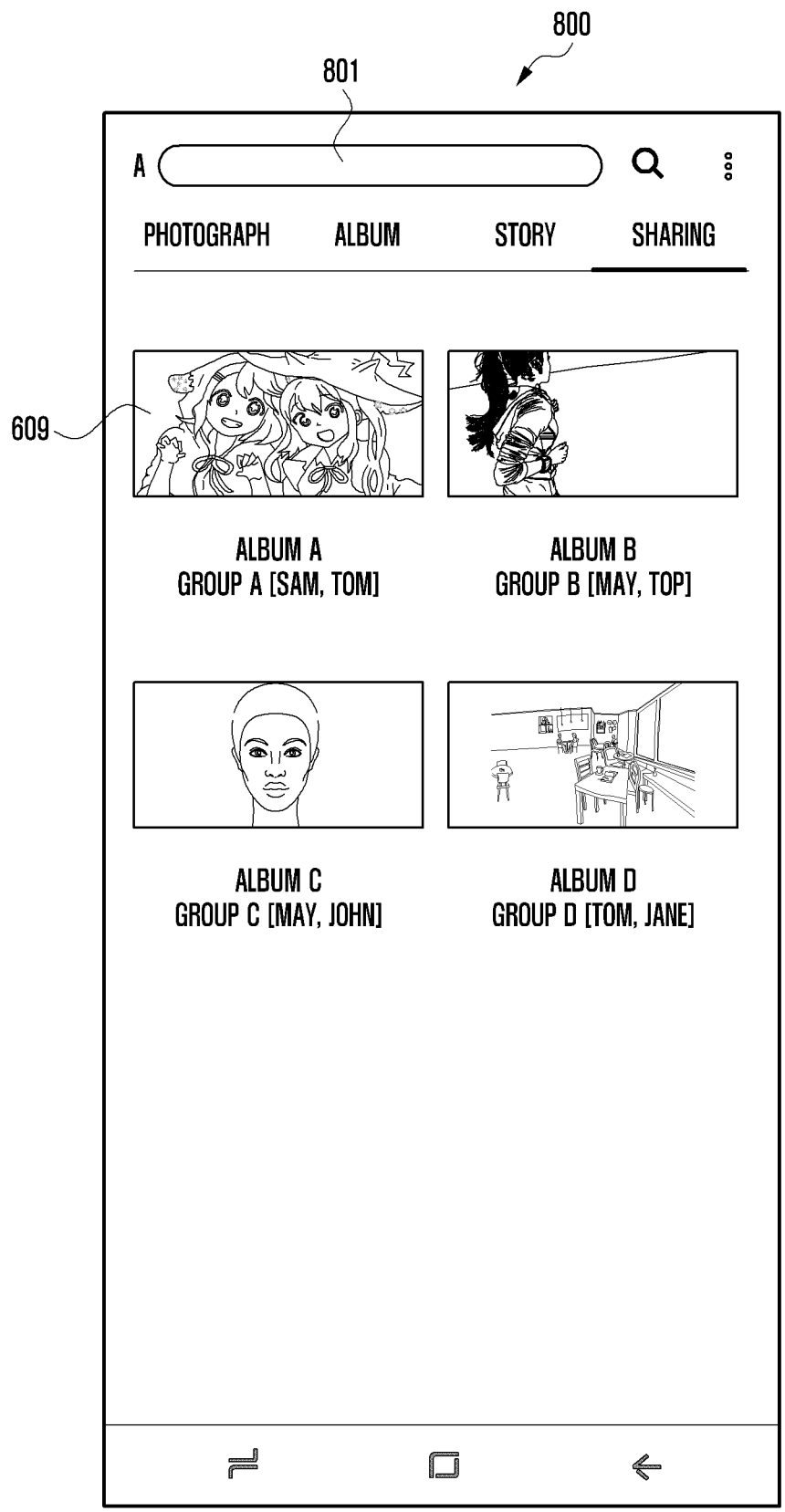
FIG. 8A is a diagram illustrating the flow of an example method for displaying albums of account groups based on a search word.
Figure 8B:
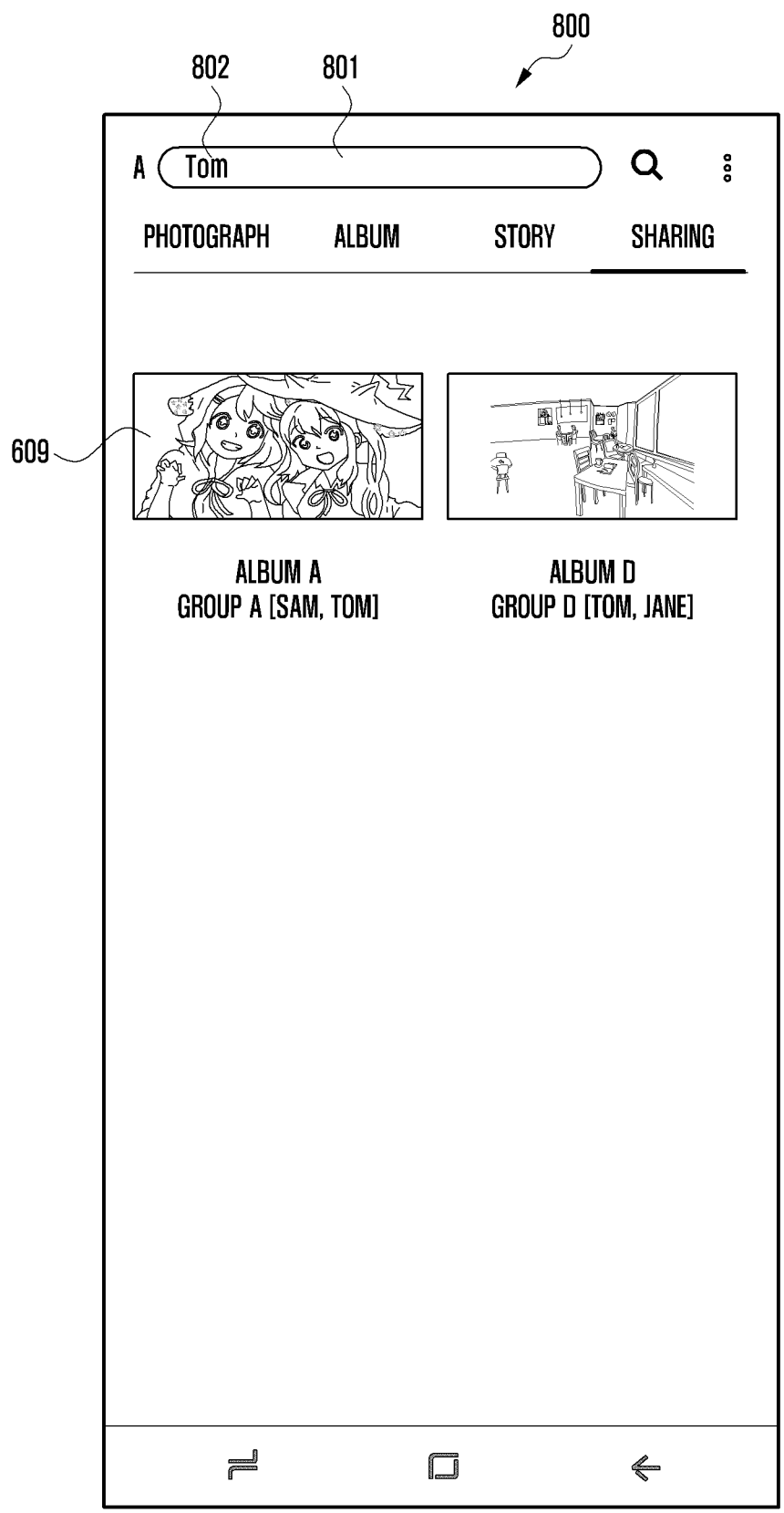
FIG. 8B is a diagram illustrating the flow of an example method for displaying albums of account groups based on a search word.

FIG. 8A is a diagram illustrating an example method for displaying albums of account groups 331 and 332 based on a search word. FIG. 8B is a diagram illustrating an example method for displaying albums of account groups 331 and 332 based on a search word.

According to a content sharing method according to an embodiment, multiple account groups (e.g., the account groups 331 and 332 of FIG. 3) may be generated, and member accounts belonging to the account group 331 may be different from those belonging to the account group 332. The electronic device 310 according to an embodiment may display an album shared on a particular account (an account group) based on a search word through a series of operations described below Referring to FIG. 8A, if the upload of a shared content is completed, the electronic device 310 according to an embodiment may display a list of the generated account groups 331 and 332 (e.g., the account group list 609 of FIGS. 6A to 6E) in a folder or album form through a sharing tab of a user interface 800 provided by a content application. According to an embodiment, the user interface 800 may include a search window 801 which allows a search for an account ID.

Referring to FIG. 8B, if an account ID 802 is input through the search window 801, the electronic device 310 according to an embodiment may display only the account groups 331 and 332 to which the input account ID 802 belongs among multiple account groups 331 and 332 (shared albums). For example, the electronic device 310 may display only the account groups 331 and 332 (e.g., album A and album D) to which the account ID "Tom" belongs, in response to the input of the account ID "Tom" through the search window.

Figure 9:
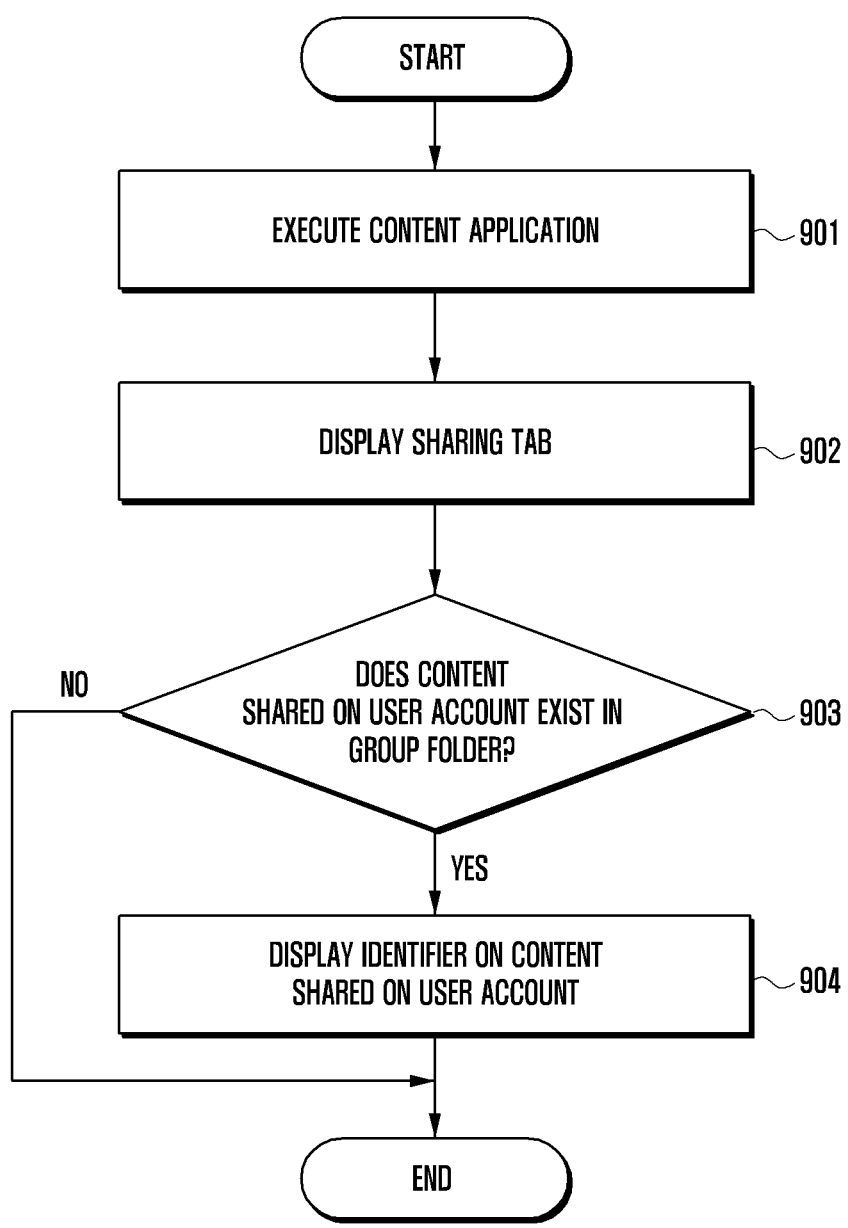
FIG. 9 is a flowchart illustrating an example method for identifying a content shared on a user's own account in a shared folder.

FIG. 9 is a flowchart illustrating an example method for identifying a content shared on a user's own account in a shared folder.

In a content sharing method according to an embodiment, an electronic device (e.g., the electronic device 310 of FIG. 3) and/or external devices (e.g., the external devices 341 and 342 of FIG. 3), which have accessed a cloud server (e.g., the cloud server 320 of FIG. 3) through an account belonging to account groups (e.g., the account groups 331 and 332 of FIG. 3), may access a storage space (e.g., the storage space 323 of FIG. 4) of the cloud server so as to upload or download a content to or from the storage space. Therefore, contents uploaded through multiple accounts may coexist in the storage space 323. The electronic device 310 according to an embodiment may easily identify a content shared on a user's own account through a series of operations described below.

In operation 901, the electronic device 310 according to an embodiment may execute a content application. For example, the electronic device 310 may execute a photograph gallery application based on a user input.

In operation 902, the electronic device 310 according to an embodiment may display a list of the generated account groups 331 and 332 in a folder and/or album form through a sharing tab of a user interface provided by the content application.

In operation 903, the electronic device 310 according to an embodiment may identify (determine) whether a content shared on the user's own account (a user account) exists in each group folder.

In operation 904, if the content shared on the user's own account (a user account) exists in each group folder, the electronic device 310 according to an embodiment may display an identifier, which indicates the content shared on the user's own account (a user account), on an object related to the relevant content.

Figure 10:
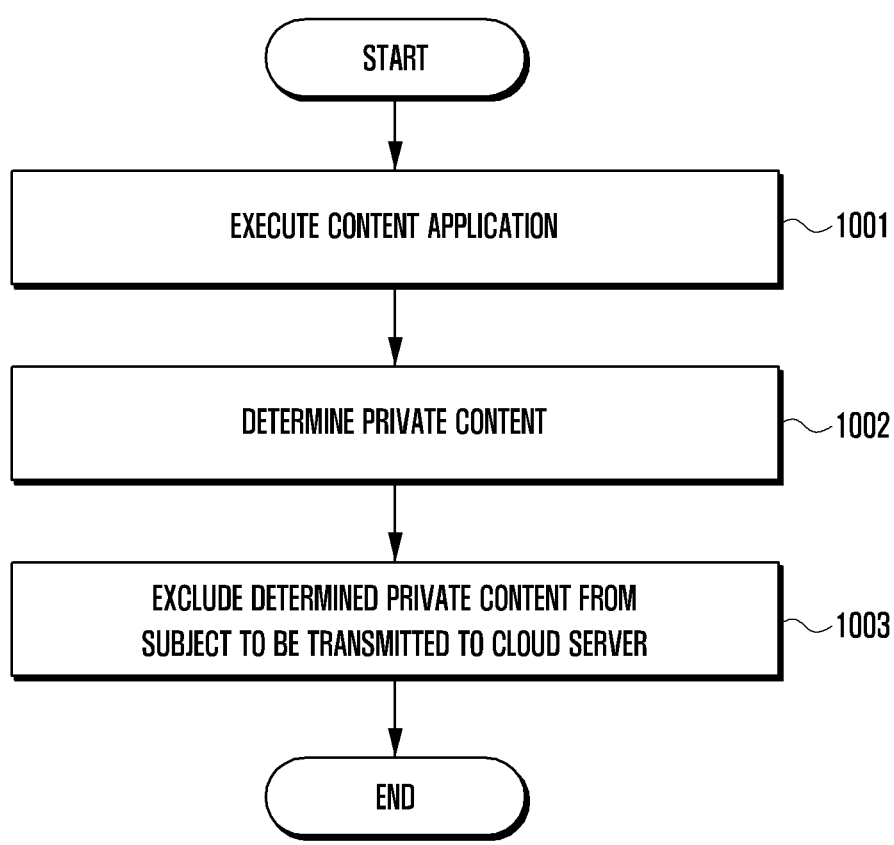
FIG. 10 is a flowchart illustrating an example method for preventing sharing of a private content.

FIG. 10 is a flowchart illustrating an example method for preventing sharing of a private content.

An electronic device (e.g., the electronic device 310 of FIG. 3) according to an embodiment can prevent unintentional sharing of a private content through a series of operations described below.

In operation 1001, the electronic device 310 according to an embodiment may execute a content application. For example, the electronic device 310 may execute a photograph gallery application based on a user input.

In operation 1002, the electronic device 310 according to an embodiment may display a user interface configured to display a list of contents, and may determine a private content through the user interface.

In operation 1003, when a shared content is transmitted to a cloud server (e.g., the cloud server 320 of FIG. 3), the electronic device 310 according to an embodiment may exclude the private content from a subject to be transmitted.

Various embodiments provide a method for enabling a user to: generate account groups 331 and 332, on which a content is to be shared, through a content application; and continuously share a content on member accounts belonging to the generated account groups 331 and 332 while maintaining the account groups 331 and 332. Further, a content is shared based on the account groups 331 and 332 on the cloud server 320, so that a content can be automatically shared with not only a portable communication device but also various devices, for example, home electronic devices, connected to an account.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood that the various example embodiments are intended to be illustrative, not limiting. Thus, one skilled in the art will understand that various changes in form or details may be made without departing from the true spirit and full scope of the disclosure as defined, for example, in the appended claims and their equivalents.

What is claimed is:

1. An electronic device comprising:
   a communication circuit;
   a processor; and
   a memory configured to store contents and a content application related to a content and electrically connected to the processor,
   wherein the memory is configured to store instructions that, when executed by the processor, control the electronic device to:
   access a cloud server through a first account;
   display a user interface including a list of the contents based on the content application being executed;
   determine at least one shared content to be shared on the cloud server in response to receiving a first input to at least one of the contents in the list of the contents stored in the memory of the electronic device through the user interface;
   after determining the at least one shared content, display a list of a plurality of pre-generated account groups, each of the pre-generated account groups including one or more external devices which have accessed storage space of the cloud server through a second account different from the first account;
   determine account group multiple account groups on the cloud server in response to a second input for selection of at least two of the account groups included in the list of the pre-generated account groups received through the user interface; and
   transmit the shared content and information related to the determined multiple account groups to the cloud server in response to a third input received through the user interface, wherein the information related to the determined multiple account groups includes account identification information of each account belonging to the determined multiple account groups,
   wherein the cloud server is to transmit the shared content transmitted from the electronic device to the one or more external devices belonging to the determined multiple account groups.

2. The electronic device of claim 1, wherein the one or more external devices in the pre-generated account groups include at least one home appliance.

3. The electronic device of claim 1, wherein the processor is configured to control the electronic device to:
   receive an input for generation of a new account group; and
   add the new account group to the list and display the list including the new account group.

4. The electronic device of claim 3, wherein the processor is configured to control the electronic device to transmit the shared content and display the list of the generated account group in an album and/or folder form.

5. The electronic device of claim 4, wherein the processor is configured to control the electronic device to display in the list only an account group to which a particular account belongs in response to an input for searching for the particular account.

6. The electronic device of claim 4, wherein the processor is configured to control the electronic device to:
   based on the shared content being transmitted,
   determine whether a content identical to the shared content exists in a storage space related to the account group on the cloud server; and
   transmit the shared content to the cloud server based on the content identical to the shared content not existing in the storage space.

7. The electronic device of claim 6, wherein the processor is configured to control the electronic device to:
   based on external devices storing external contents stored in the external devices in the storage space through the second account belonging to the account group,
   receive the external contents from the cloud server; and
   add the received external contents to the album and/or the folder corresponding to the account group.

8. The electronic device of claim 7, wherein the processor is configured to control the electronic device to:

display the shared content and/or the external contents included in the album and/or the folder in response to an input for selection of the album and/or the folder; and display an identifier on an object related to the shared content indicating the shared content.

9. The electronic device of claim 1, wherein the processor is configured to control the electronic device to:
   determine, as a private content, at least a part of the list of the contents based on an input; and
   exclude the determined private content from a subject to be transmitted to the cloud server.

10. The electronic device of claim 1, wherein the content application comprises a photograph gallery application.

11. A method for sharing a content based on an account group by an electronic device, the method comprising:
   accessing a cloud server through a first account;
   displaying a user interface including a list of contents based on a content application being executed;
   determining at least one shared content to be shared on the cloud server, in response to receiving a first input to at least one of the contents in the list of contents stored in memory of the electronic device through the user interface;
   after determining the at least one shared content, displaying a list of a plurality of pre-generated account groups, each of the pre-generated account groups including one or more external devices which have accessed storage space of the cloud server through a second account different from the first account;
   determining multiple account groups on the cloud server in response to receiving a second input for selection of at least two of the account groups included in the list of the pre-generated account groups through the user interface; and
   transmitting the shared content and information related to the determined multiple account groups to the cloud server in response to receiving a third input through the user interface, wherein the information related to the determined multiple account groups includes account identification information of each account belonging to the determined multiple account groups;
   wherein the cloud server transmits the shared content transmitted from the electronic device to the one or more external devices belonging to the determined multiple account groups.

12. The method of claim 11, wherein the one or more external devices in the pre-generated account groups include at least one home appliance.

13. The method of claim 11, wherein the determining of the account group comprises:
   determining the account group based on an input for generation of a new account group; and
   adding the new account group to the list and displaying the list including the new account group.

14. The method of claim 13, further comprising transmitting the shared content and displaying the list of the generated account group in an album and/or folder form.

15. The method of claim 14, further comprising displaying only an account group, to which a particular account belongs in the list in response to an input for searching for the particular account.

16. The method of claim 14, wherein the transmitting of the shared content comprises:
   determining whether a content identical to the shared content exists in the storage space related to the account group on the cloud server; and
   transmitting the shared content to the cloud server based on the content identical to the shared content not existing in the storage space.

17. The method of claim 16, further comprising:
   based on external devices storing external contents stored in the external devices in the storage space through the second account belonging to the account group,
   receiving the external contents from the cloud server; and
   adding the received external contents to the album and/or the folder corresponding to the account group.

18. The method of claim 17, further comprising:
   displaying the shared content and/or the external contents included in the album and/or the folder in response to an input for selection of the album and/or the folder; and
   displaying an identifier on an object related to the shared content indicating the shared content.

19. The method of claim 11, further comprising:
   determining, as a private content, at least a part of the list of the contents based on an input; and
   excluding the determined private content from a subject to be transmitted to the cloud server.

20. A non-transitory computer readable recording medium having stored thereon one or more computer programs including instructions that, when executed by at least one processor of an electronic device, control the electronic device to perform operations comprising:
   accessing a cloud server through a first account;
   displaying a user interface including a list of contents based on a content application being executed;
   determining at least one shared content to be shared on the cloud server in response to receiving a first input to at least one of the contents in the list of contents stored in memory of the electronic device through the user interface;
   after determining the at least one shared content, displaying a list of a plurality of pre-generated account groups, each of the pre-generated account groups including one or more external devices which have accessed storage space of the cloud server through a second account different from the first account;
   determining multiple account groups on the cloud server in response to receiving a second input for selection of at least two of the account groups included in the list of the pre-generated account groups through the user interface; and
   transmitting the shared content and information related to the determined multiple account groups to the cloud server in response to receiving a third input through the user interface, wherein the information related to the determined multiple account groups includes account identification information of each account belonging to the determined multiple account groups,
   wherein the cloud server is to transmit the shared content transmitted from the electronic device to the one or more external devices belonging to the determined multiple account groups.

* * * * *